(12) United States Patent
Braennstroem et al.

(10) Patent No.: US 9,315,174 B2
(45) Date of Patent: Apr. 19, 2016

(54) ONBOARD PERCEPTION SYSTEM

(75) Inventors: Mattias Braennstroem, Goeteborg (SE); Andrew Backhouse, Goeteborg (SE); Lars Hammarstrand, Varekil (SE); Christian Applehult, Goeteborg (SE)

(73) Assignee: Volvo Car Corporation, Gothenburg (SE)

(*) Notice: Subject to any disclaimer, the term of this patent is extended or adjusted under 35 U.S.C. 154(b) by 511 days.

(21) Appl. No.: 13/367,681

(22) Filed: Feb. 7, 2012

(65) Prior Publication Data

US 2012/0203436 A1     Aug. 9, 2012

(30) Foreign Application Priority Data

Feb. 8, 2011 (EP) .................................. 11153611

(51) Int. Cl.
| | |
|---|---|
| B60T 7/22 | (2006.01) |
| B60W 30/095 | (2012.01) |
| B60R 21/01 | (2006.01) |
| B60R 21/0134 | (2006.01) |
| B60R 21/013 | (2006.01) |

(52) U.S. Cl.
CPC ................. *B60T 7/22* (2013.01); *B60R 21/013* (2013.01); *B60R 21/0134* (2013.01); *B60T 2201/024* (2013.01); *B60W 30/095* (2013.01); *B60W 2550/302* (2013.01); *B60W 2550/308* (2013.01)

(58) Field of Classification Search
None
See application file for complete search history.

(56) References Cited

U.S. PATENT DOCUMENTS

| | | | | |
|---|---|---|---|---|
| 5,979,586 | A * | 11/1999 | Farmer et al. | 180/274 |
| 6,324,450 | B1 * | 11/2001 | Iwama | 701/32.2 |
| 6,718,239 | B2 * | 4/2004 | Rayner | 701/32.6 |
| 7,586,402 | B2 | 9/2009 | Bihler et al. | |
| 8,031,085 | B1 * | 10/2011 | Anderson | B60Q 5/008 340/425.5 |
| 8,362,921 | B2 * | 1/2013 | Pan | 340/901 |
| 8,538,674 | B2 | 9/2013 | Breuer et al. | |
| 2004/0193347 | A1 | 9/2004 | Harumoto et al. | |
| 2005/0041529 | A1 * | 2/2005 | Schliep et al. | 367/99 |
| 2005/0073433 | A1 * | 4/2005 | Gunderson et al. | 340/903 |
| 2006/0089764 | A1 * | 4/2006 | Filippov et al. | 701/23 |
| 2006/0261979 | A1 * | 11/2006 | Draaijer et al. | 340/937 |
| 2007/0016372 | A1 * | 1/2007 | Browne et al. | 701/213 |

(Continued)

FOREIGN PATENT DOCUMENTS

| | | |
|---|---|---|
| AU | 2009308192 | 4/2010 |
| CN | 101475002 | 7/2009 |

(Continued)

OTHER PUBLICATIONS

Extended European Search Report for European Application No. 11153611.6, Completed by the European Patent office, Dated Jul. 15, 2011, 6 Pages.

(Continued)

*Primary Examiner* — James Trammell
*Assistant Examiner* — Demetra Smith-Stewart
(74) *Attorney, Agent, or Firm* — Brooks Kushman P.C.

(57) ABSTRACT

An onboard perception system of a vehicle is contemplated. The system may include a state assessment unit adapted to at least assess a state of a first external object located in a vicinity of the vehicle hosting the onboard perception system, at least a first sensor assembly for assessing sound information, and an evaluation means adapted to evaluate a change in the state of the first external object by using the assessed sound information.

15 Claims, 3 Drawing Sheets

(56) References Cited

U.S. PATENT DOCUMENTS

| | | | |
|---|---|---|---|
| 2007/0067079 A1* | 3/2007 | Kosugi | 701/35 |
| 2007/0192910 A1* | 8/2007 | Vu et al. | 901/17 |
| 2009/0052687 A1* | 2/2009 | Schwartz | 381/92 |
| 2009/0188742 A1* | 7/2009 | Dukart et al. | 180/274 |
| 2009/0207006 A1* | 8/2009 | Richter et al. | 340/435 |
| 2010/0114467 A1 | 5/2010 | Samuel et al. | |
| 2012/0296524 A1* | 11/2012 | Kido | 701/41 |
| 2012/0316725 A1* | 12/2012 | Trepagnier et al. | 701/26 |
| 2013/0009791 A1* | 1/2013 | Yoshioka et al. | 340/935 |
| 2014/0012787 A1* | 1/2014 | Zhang | 706/12 |

FOREIGN PATENT DOCUMENTS

| | | |
|---|---|---|
| DE | 4312595 | 3/1994 |
| DE | 10206351 | 9/2003 |
| DE | 10206351 B4 * | 8/2004 |
| DE | 102004062459 | 4/2006 |
| DE | 102006040651 A1 | 3/2008 |
| JP | 407069132 A * | 3/1995 |
| WO | 03012475 A1 | 2/2003 |

OTHER PUBLICATIONS

Chinese Office Action for Chinese Application No. 201210027820.0, English Translation attached to original, Dated Jul. 1, 2015, All together 16 Pages.

European Patent Office Written Opinion (related EP Application No. 11 153 611.6), dated Feb. 8, 2016; 4 pages.

* cited by examiner

ONBOARD PERCEPTION SYSTEM

CROSS-REFERENCE TO RELATED APPLICATIONS

This application claims foreign priority benefits under 35 U.S.C. §119(a)-(d) to EP 11153611.6, filed Feb. 8, 2011, the disclosure of which is incorporated in its entirety by reference herein.

TECHNICAL FIELD

The present invention relates to an onboard perception system of a vehicle and a vehicular collision avoidance system comprising a passive sound sensor. Additionally, the present invention relates to a method for evaluating a reason of a change in dynamic state of an external object located in a vicinity of a vehicle by analyzing sound information originating in the vicinity.

BACKGROUND

Every year many persons are involved in traffic-related accidents resulting in injury or death. In order to reduce the number of accidents and/or to reduce their impact, vehicle safety systems have been developed.

Protective safety systems, such as bumpers, seat belts, crumple zones and air-bags have been in use for many years. They work by dispersing the kinetic energy resulting from a collision in order to protect the occupants of the vehicle.

In addition to the protective safety systems, another type of safety systems has been introduced in the recent years. These in-vehicle systems are designed to help the driver to prevent, avoid or mitigate an impending collision or accident. They are therefore called preventive safety systems. Advanced preventive safety systems work by not only sensing the motion of vehicle hosting the system but also perceiving the traffic situation around the vehicle. They are able to inform the driver of possible danger, to warn the driver of an impending accident, and to detect and classify dangerous situations. In addition, the system may actively assist or intervene in the operation of the vehicle in order to avoid the accident or mitigate its consequences.

A collision avoidance system is an example of a preventive safety system. If a collision is likely to occur and the system detects that the driver does not react in an appropriate manner, the system may be adapted to apply an emergency operation and/or to warn the driver. For example, when the system determines that a collision is unavoidable, it may apply an autonomous brake to the vehicle. If the speed is too high to be able to avoid the obstacle ahead, e.g. a lead vehicle, the system may at least help to lower the speed in order to reduce the consequences of the collision. As described herein, the term collision avoidance system is used for systems adapted to avoid collisions as well as systems mitigating the consequences of a collision. Often, the difference between whether a collision is avoided or not depends on the speed of the host vehicle and the relative speed to the obstacle.

The term host vehicle is herein used to refer to the vehicle which hosts an onboard perception system. The term onboard means that the system is adapted to be used in or on a vehicle. Normally an onboard perception system forms a part of a collision avoidance system as explained below. The term lead vehicle is used to refer to the vehicle located closest to and in front of the host vehicle. Normally the lead vehicle is driving in essentially the same direction as the host vehicle.

In general, a collision avoidance system comprises three separate subsystems: a perception system, a detection system and an action system. The perception system comprises different sensors, which are used to determine the motion of the host vehicle and to perceive the traffic situation therearound. The detection system uses the output of the perception system in order to detect possible adverse situations and make a decision to inform, warn or intervene. The action system executes the action or actions decided by the detection system.

The execution of a possible intervention is a trade-off between effectiveness of the collision avoidance system and the risk of having a false intervention. It is for example undesirable that the collision avoidance system brakes the host vehicle without there actually being a real emergency situation.

In rush-hour-traffic, the traffic is often dense and the time-gap between vehicles can be small. The collision avoidance system can help the driver by continuously or intermittently assessing the distance between the own vehicle, i.e. the host vehicle, and the lead vehicle, i.e. a vehicle in front of the host vehicle. If the host vehicle comes too close to the lead vehicle, the collision avoidance system may actively intervene in order to avoid a collision or at least to mitigate its consequences.

Document DE 10 2006 040 651 A1 discloses a vehicle collision detection device. The device uses a non-directional airborne sound sensor system to characterize a collision object. This information is combined with information from an impact sound sensor. The information may be used to activate a personal protection means, such as an airbag, belt tightener or an active seat. An independent claim is also included for a method for detecting a collision between the vehicle and a collision object.

The system of DE 10 2006 040 651 A1 thus detects an already occurred collision between the host vehicle itself and another object. However, the purpose of a collision avoidance system is to avoid the collision or at least mitigate its consequences. It would thus be too late if the collision first occurs and thereafter is detected.

Current collision avoidance systems rely on their perception systems to refine noisy sensor measurements regarding the position and velocity of a lead vehicle, e.g. radar measurements. These perception systems employ filters to reduce the dynamics of lead vehicle position and velocity signals in order for the collision avoidance system to be robust against sensor anomalies. However, in situations where something unexpected happens to the lead vehicle, such as the lead vehicle being involved in a collision, it is difficult to distinguish a sensor anomaly from the fact that the lead vehicle actually has suddenly changed its motion, e.g. abruptly being brought to a stand still, based on the sensor observations. In such situations, the dynamic behavior is significantly different from what is expected in normal traffic situations and a conventional perception system will therefore face difficulties in such a situation.

It is thus desirable to provide an onboard perception system being robust against sensor anomalies and yet having appropriate performance in high dynamic situations, such as when the tracked vehicle is involved in a collision.

SUMMARY

One object of the invention is to reduce or ameliorate at least one of the disadvantages of the prior art, or to provide a useful alternative.

As such, the present invention relates to an onboard perception system for a vehicle. The onboard perception system comprises:
- a state assessment means adapted to at least assess a state of a first external object located in a vicinity of the vehicle hosting the onboard perception system,
- at least a first sensor assembly for assessing sound information, and
- an evaluation unit adapted to evaluate a reason of a change in the state of the first external object by using the assessed sound information.

The host vehicle is herein used to denote the vehicle which hosts the onboard perception system. Onboard refers to that the perception system is adapted to be used in or on the vehicle. The first external object is commonly a lead vehicle, but it may also be an oncoming vehicle or a crossing vehicle or any other type of object. By external is meant that it is outside of the vehicle. Alternatively, the first external object may be another road user such as a pedestrian, bicyclist, motor cycle or an animal.

The change in dynamic state of the first external object may be large and sudden. The dynamic state of the first external object may include state variables such as position, velocity, acceleration, heading angle, yaw rate, roll angle, roll rate, pitch angle, pitch rate and/or shape of the first external object or combinations thereof. These state variables may be assessed in relation to the ground or in relation to another vehicle. In particular, the state variables of the first external object may be assessed in relation to the host vehicle. Purely as an example, assessing the position of the first external object in relation to the host vehicle, would give the distance between the host vehicle and the first external object. A change of dynamic state could in that example correspond to a decrease of the assessed distance between the host vehicle and the first external object.

The term vicinity is used to indicate an area of interest around the host vehicle from a vehicle safety point of view, i.e. the area characterized by that if safety influencing incident would occur in this area, the host vehicle would be influenced if no measures were to be taken. The vicinity is related to the host vehicle and therefore moves along with the host vehicle. It may comprise an area, in which it is feasible for the vehicle to pass during the next few seconds, for example within the next 1, 2 or 3 seconds. In particular, the vicinity may comprise the area the host vehicle is expected to pass during the next few seconds, i.e. the area in or close to that of an intended travelling path of the host vehicle. The shape and the size of the vicinity may be speed dependent, such that e.g. the size of the vicinity increases with the speed of the host vehicle. The shape may be elongate, e.g. elliptic, but other shapes including more complicated geometries are possible. The size and shape may further be influenced by external factors such as traffic conditions, e.g. low or dense traffic, weather conditions, e.g. precipitation, or road conditions, e.g. muddy, snowy or icy road. Typically, the vicinity has a maximal extension, i.e. maximum distance from the host vehicle to the other edge of the vicinity, of between 100 and 200 meters. The size of the vicinity may further be influenced by the detection range of the sensors used in the collision avoidance system, such that the sensors are capable of detecting objects within this area.

The change in the state of the first external object may be, at least partly, caused by the first external object being involved in a collision. Then, all of a sudden, the first external object would get a much lower, or higher, speed. In the case that the first external object is the lead vehicle, the distance to the host vehicle would then be rapidly decreased. The first external object may have collided with a second external object, such as a vehicle driving in front of the first external object, an oncoming vehicle or a crossing vehicle. The second external object may also be another road user such as a pedestrian, bicyclist or motor cycle. It could also be an object suddenly entering the road, such as an animal jumping onto the road. The first external object may also collide with a still-standing second external object such as a road sign, a guard rail, a drainage lid, a traffic light or a hole in the road. The change in the state may also be caused by first external object having a fatal breakdown like dropping a wheel, an exploding tire or the bonnet suddenly opening up at speed smashing the windscreen.

Another example of a change in the state of the first external object is if a vehicle travelling in the opposite lane for oncoming traffic has stopped to make a left-hand turn and then all of a sudden is hit from behind by another vehicle. The consequence could in that case be that the first external object is pushed out right in front of the host vehicle.

Yet another example is if a crossing vehicle standing at a traffic light waiting for green light is hit from behind and pushed out into the crossing road.

Still another example is a vehicle making a lane change and hitting the rear end of another vehicle being in front of it, thereby pushing this other vehicle into the lane of the host vehicle.

The state of the first external object may be assessed by measurements. The state may also be communicated to the host vehicle, e.g. from the first external object or from the infrastructure. Alternatively, the state may be assessed based on GPS information or another external system.

By being able to combine assessed dynamic state with assessed sound information, the onboard perception system according to the invention is more robust to sensor anomalies during normal traffic as compared to a conventional onboard perception system. Yet, the onboard perception system according to the invention has appropriate performance in high dynamic situations, such as a collision involving the first external object.

If only one source of information is used, as in a conventional onboard perception system, and something unexpected is detected, the system cannot determine if the unexpected state assessment is due to a sensor anomaly or if something unexpected has actually happened. The conventional system therefore usually makes additional state assessments before drawing the conclusion that something unexpected has actually happened. Such additional state assessments take time to perform; time which is very valuable in a critical traffic situation.

The state assessment of the onboard perception system will occasionally give false assessments, so called clutter observations. These may be due to that, instead of assessing the state of the first external object, the state of another object such as a road sign or a drainage lid is assessed. However, since collisions are rarely observed by an individual host vehicle, it is highly improbable that such a clutter observation would be made at the same time as a sound is being assessed indicating e.g. a collision. Conversely, should an unexpected assessment actually be made at the same time as for example the sound of a collision is being assessed, it is highly probable that a collision actually has occurred. The two information sources thus reinforce each other and help the system to draw a correct conclusion. This difference to a conventional system may be used by the system according to the invention to come to a quicker conclusion than a conventional system and/or to come to a more accurate conclusion.

The system according to the invention is further able to take into consideration that the speed of sound is much lower than the speed of light. It thus takes some time for the sound of the collision to reach the host vehicle. Purely as an example, the sound would travel much slower than a radar signal. The system is however able to compensate for this delay of the sound. The term "at the same time" thus relates to that the sound and the unexpected state assessment refers to the same incident, e.g. a collision. The source of the respective signal is occurring at the same time, e.g. a collision, even if the sound is recorded after the state assessment is made, using e.g. the radar signal.

The state assessment must not necessarily be carried out at the same time as the sound information is being assessed, as long at the two different information sources may be related to the same incident changing the state of the first external object, e.g. a collision. The system according to the invention is for example able to handle if the state assessment means may be temporarily obscured by another external object at the time the state changing incident occurs. The sound may in that case be assessed during the incident. A few moments later, when the state assessment is no longer obscured, a state assessment may be made and thus related afterwards to the same incident. Another example is if the colliding first external object is outside the field of view of the state assessment means at the collision moment, but the sound may be possible to assess. A few moments later, when the first external object is within the field of view of the state assessment means, the state assessment can be made and is thus related afterwards to the same incident.

The state assessment means may comprise a second sensor assembly adapted to measure at least a state of the first external object. Examples of state variables are given above. The second sensor assembly may comprise at least one of: a radar sensor, a lidar sensor, a camera, a stereo-camera, an ultrasonic sensor or an IR sensor. One, two or more sensors may be used in the second sensor assembly.

The first sensor assembly may comprise a plurality of sound-detecting sensors. If more than one sensor is used, the sensors may be placed in an array, preferably so that it is possible to detect wherefrom a sound is coming.

The first sensor assembly may be located inside and/or outside the vehicle. A sensor inside the vehicle is well protected from the environment, for example it will not be exposed to rain, snow, mud or wind. A sensor outside the vehicle will be closer to the sound source and the vehicle will not subdue the sound. An outside sensor is less prone to pick up sounds from the inside of the vehicle, such as speech or music.

The onboard perception system may be adapted to consider two parallel traffic situation hypotheses for the vicinity of the vehicle, the first hypothesis being a normal traffic situation and the second hypothesis being a collision situation. The onboard perception system may then further be adapted to select one of the hypotheses based on the assessed sound information and optionally on the assessed state between the vehicle and the first external object. The probability of which of these hypotheses is currently correct is preferably calculated using both sources of information: the assessed state and the assessed sound information. Both of these sources of information should preferably agree for the probability of a hypothesis to be sufficiently high.

In the normal traffic situation hypothesis, the dynamics of the filters of the onboard perception system are tuned to give desired performance in normal traffic scenarios. Under the collision hypothesis the filters are designed to cover the high dynamics during a collision. Due to the specific behavior of a collision it is possible to design the onboard perception system to very accurately describe the position and motion of the colliding vehicle.

An output from the onboard perception system may comprise an estimate of a state of the first external object. Examples of state variables are given above. Since two independent sources of information may be used, i.e. the assessed state and the assessed sound information, the estimate may be made more accurately than an estimate based only on one information source, which would be the case in a conventional system. The output may further include information about if and when the first external object was subjected to a safety influencing incident, such as a collision, and also about which kind of incident it was and how serious it was.

In a second aspect of the present invention, there is provided a vehicular collision avoidance system comprising an onboard perception system according to above.

By improving the performance of the onboard perception system, the performance of the collision avoidance system comprising such an onboard perception system may also be improved. This will help to avoid a collision or a least mitigate its consequences. It may be particularly helpful in a multiple vehicle crash situation.

In a third aspect of the present invention, there is provided a vehicle comprising a vehicular collision avoidance system as mentioned above or an onboard perception system as mentioned above.

In a fourth aspect of the present invention, there is provided a method for evaluating a reason of a change in a state of a first external object in an onboard perception system, the first external object being located in a vicinity of a vehicle hosting the onboard perception system. The method comprises:

assessing sound information from a vicinity of the vehicle using a first sensor assembly, and analyzing the sound information in order to evaluate the reason of the change in the state of the first external object.

The reason to of the change in the state of the first external object may be a collision involving the first external object. Examples of state variables are given above. The first external object may have collided with a second external object, such as a vehicle driving in front of the first external object, an oncoming vehicle or a crossing vehicle. The second external object may also be another road user such as a pedestrian, bicyclist or motor cycle. It could also be an object suddenly entering the road, such as an animal jumping onto the road. The first external object may also collide with a still-standing second external object such as a road sign, a guard rail, drainage lid, a traffic light or a hole in the road. The change in the state may also be caused by the first external object having a fatal breakdown like dropping a wheel, an exploding tire or the bonnet suddenly opening up at speed smashing the windscreen.

The method may further comprise:

measuring the state of the first external object, and combining the measured state with the sound information when performing the evaluation of the reason of the change of the state of the first external object.

The method may further comprise:

giving an estimate of a state of the first external object, the estimate being based on the sound information and/or the assessed state of the first external object.

Examples of state variables are given above. Since two independent sources of information may be used, i.e. the assessed state and the assessed sound information, the estimate may be made more accurately than an estimate based only on one information source.

The method may further comprise:
considering two parallel traffic situation hypotheses for the vicinity, the first hypothesis being a normal traffic situation and the second hypothesis being a collision situation, and
selecting one of the hypotheses based on the sound information and optionally on the assessed state of the first external object.

In the normal traffic situation hypothesis, the dynamics of the filters of the onboard perception system are tuned to give desired performance in normal traffic scenarios. Under the collision hypothesis the filters are designed to cover the high dynamics during a collision. Preferably both sound information and the assessed state are used for selecting the hypotheses.

In a fifth aspect of the present invention, there is provided a use of a sound-assessing sensor assembly in an onboard perception system for a vehicle for detecting if a collision has occurred in a vicinity of the vehicle.

In a sixth aspect of the present invention, there is provided a use of a sound-assessing sensor assembly in combination with a state assessment means in a vehicular onboard perception system for detecting if a collision has occurred in a vicinity of the vehicle.

BRIEF DESCRIPTION OF THE DRAWINGS

The present invention will hereinafter be further explained by means of non-limiting examples with reference to the appended figures wherein.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention will, in the following, be exemplified by embodiments. It should however be realized that the embodiments are included in order to explain principles of the invention and not to limit the scope of the invention, defined by the appended claims. Details from two or more of the embodiments may be combined with each other. Further modifications of the invention within the scope of the appended claims are feasible. As such, the present invention should not be considered as limited by the embodiments and figures described herein. Rather, the full scope of the invention should be determined by the appended claims.

In the examples below, a distance to the host vehicle is used as an example of the assessed state of the first external object. Examples of other state variables are given in the section above, but are not illustrated by examples below.

Even if the example below describe a situation involving a lead vehicle, the onboard perception system and the method according to the invention may also be applied for situations involving oncoming or crossing vehicles.

Figure 1:
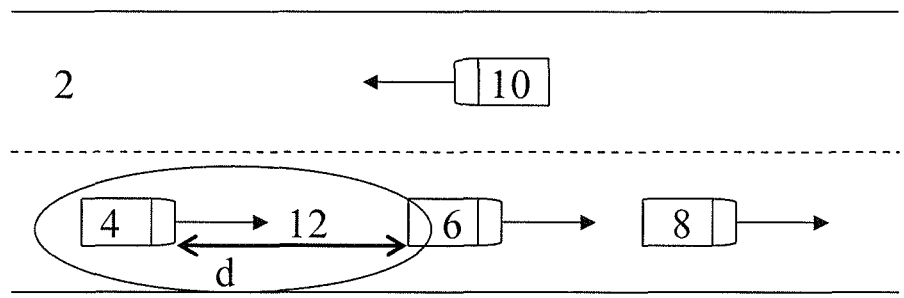
FIG. 1 is a schematic view of a traffic situation.

FIG. 1 schematically illustrates a traffic situation on a road 2. The host vehicle 4 hosting an onboard perception system is driving on the road 2. In front of the host vehicle 4 there is a first external object, in this case a lead vehicle 6. The distance between the host vehicle 4 and the first external object 6 is denoted by d. There is further a second external object in front of the lead vehicle 6, in this case another vehicle 8 driving in substantially the same direction as the host vehicle 4 and the lead vehicle 6. There is also oncoming traffic represented by an oncoming vehicle 10. The objects are here represented by vehicles, but they may also be other road users, such as a motor cyclist, bicyclist or pedestrian.

FIG. 1 further indicates the vicinity 12 of the host vehicle 4. If a safety influencing incident occurs in this area, the host vehicle 4 would be influenced if no measures were to be taken. In particular, the vicinity 12 comprises the area the host vehicle 4 is expected to pass during the next few seconds, i.e. the area being in or close to an intended travelling path of the vehicle. The vicinity 12 is related to the host vehicle 4, it therefore moves along together with the host vehicle 4. The size and shape of the vicinity 12 may depend on factors such as position, speed and/or acceleration of the host vehicle 4. It may also be influenced by external factors such as traffic conditions, e.g. low or dense traffic, weather conditions, e.g. precipitation, or road conditions, e.g. muddy, snowy or icy road. The vicinity may have an elliptical shape like in the illustrated embodiment, wherein the major axis of the ellipse substantially coincides with the expected travelling path of the host vehicle 4.

Figure 2:
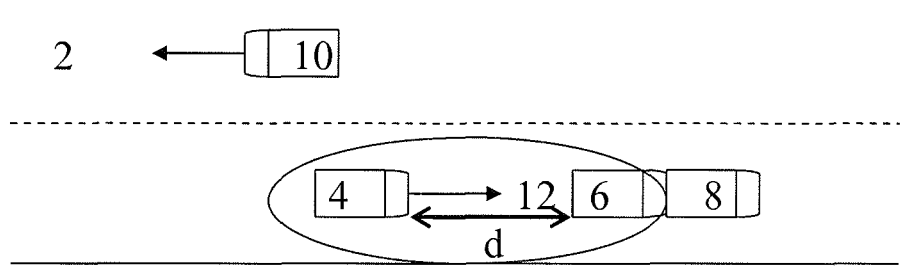
FIG. 2 is a schematic view of the traffic situation after a collision has occurred.

FIG. 2 illustrates the same road 2 a few moments later as compared to FIG. 1. The host vehicle 4 has moved to the right in the figure. A decrease of the assessed distance d between the vehicle 4 and the first external object, i.e. lead vehicle 6, is observed. The reason for this unexpected decrease is that a collision has occurred between the lead vehicle 6 and the other vehicle 8. Purely as an example, this collision might have occurred due to the fact that the driver of the lead vehicle 6 was distracted and did not notice that the other vehicle 8 was braking. The lead vehicle 6 consequently has very suddenly and abruptly changed its motion due to the collision.

The unexpected decrease of the assessed distance d might also occur due to other reasons than a collision, such as the lead vehicle 6 running into a deep hole in the road, onto a road sign or having a fatal breakdown like dropping a wheel, an exploding tyre or a suddenly opening bonnet.

Figure 3:
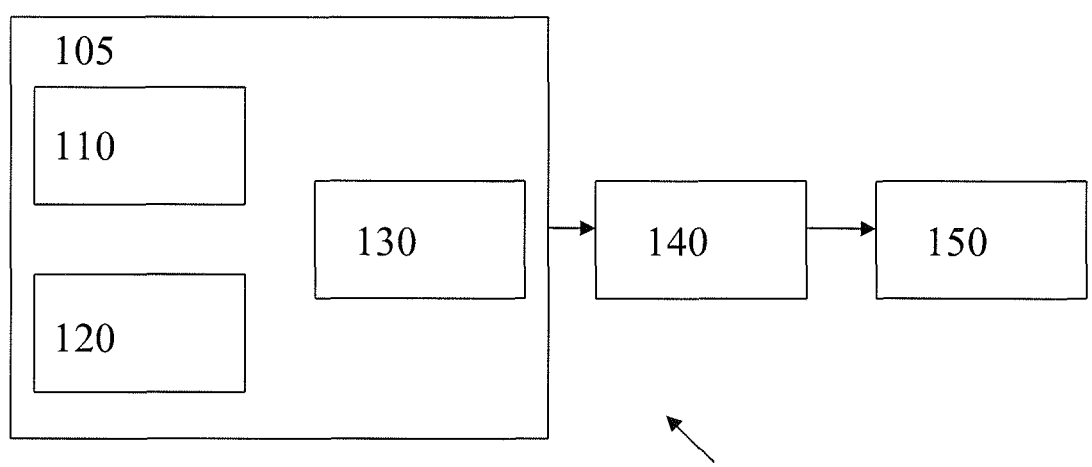
FIG. 3 illustrates an onboard perception system according to the invention.

FIG. 3 illustrates schematically a collision avoidance system 100 according to the invention. Besides the onboard perception system 105 according to the invention, there is also a detection system 140 and an action system 150. The detection system 140 uses the output of the onboard perception system 105 in order to detect dangerous situations and make a decision to inform, warn or intervene. The action system 150 executes the action or actions decided by the detection system 140.

The onboard perception system 105 comprises:
a dynamic state assessment assembly 110 adapted to continually assess a dynamic state of the first external object located in the vicinity of the vehicle,
at least a passive sound sensor assembly 120 for detecting and assessing sound information originating in the vicinity of the vehicle, and evaluation unit 130 adapted to evaluate a reason of the change in the state of the first external object by using the assessed sound information.

In the illustrated example the state assessment means 110 is adapted to at least assess a distance d between the vehicle 4 and a first external object 6. It may comprise a second sensor assembly adapted to at least measure the distance d to the first external object 6. Preferably, the second sensor assembly is adapted to also measure speed, acceleration, heading angle and/or yaw rate of the first external object 6. The second sensor assembly may use electromagnetic radiation, such as radio waves, light, infrared light or ultraviolet light. It may include a radar sensor, a lidar sensor, a camera, a stereo-camera, an ultra-sonic sensor or an IR sensor.

The passive sound sensor assembly 120 may comprise one, two or more sound sensors. If a plurality of sensors is used, the sensors may be placed in an array, preferably so that it is possible to detect a direction and/or location from which a sound originating in the vicinity of the vehicle is coming. The passive sound sensor assembly 120 may be located inside and/or outside the host vehicle. The passive sound sensor assembly 120 is adapted to assess sounds related to the change of the state of the first external object, but may also be used for other applications such as detection of road surface or specific sounds, such as the sound of a smashed glass indicating a burglary.

A common sound sensor is a microphone. One implementation of a microphone generates signals when its membrane is moving, and is therefore sensitive to wind and shocks. The suspension of the vehicle (not illustrated) is preferably adapted to protect the microphone from constant shocks.

Figure 4:
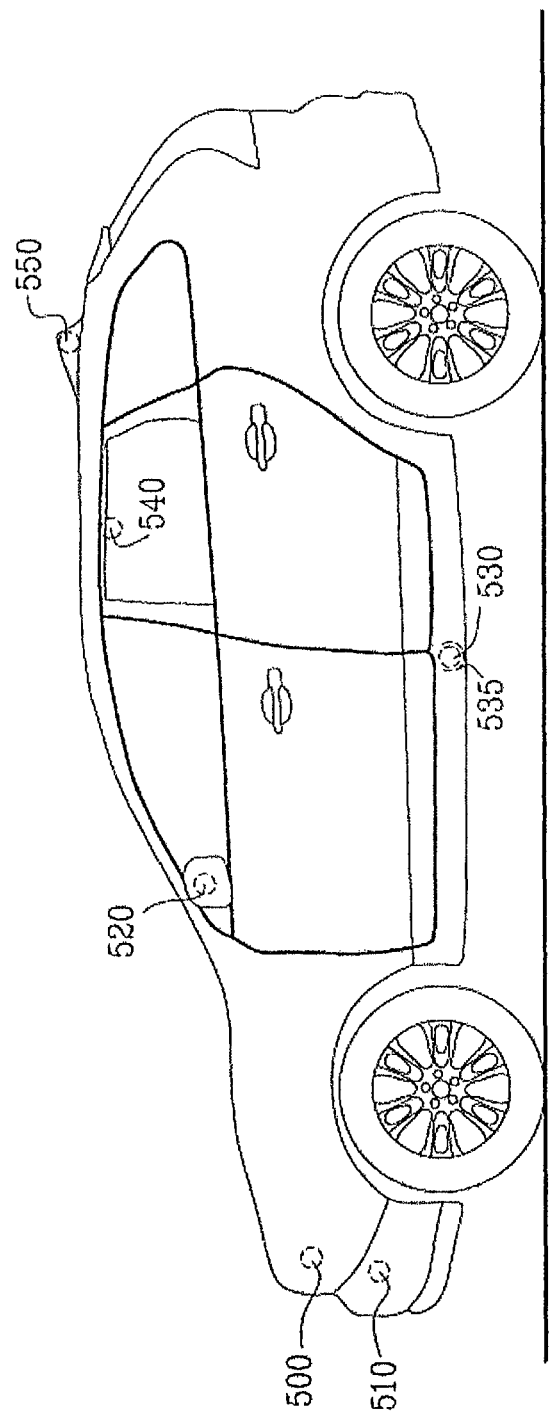
FIG. 4 is a schematic illustration of a vehicle illustrating possible locations for a first sensor assembly.

Examples of possible locations for the first sensor assembly 120 are presented below with reference to FIG. 4:

Behind the radar cover, 500: This position allows for a good protection from the wind. The location in the very front of the vehicle should be a good position for detecting what happens in the travelling path in front of the host vehicle 4. The engine fan might cause disturbances through the wind it generates and other sounds from the engine itself and ancillaries might cause disturbing sounds.

Behind the frontal bumper, 510: Similar to the position behind the radar cover. This is possibly a more subdued environment.

Inside a side mirror, 520: Allows good protection from the wind. No other noise sources present. However, if the passenger window is open the first sensor assembly might be exposed to sounds from music or any other source used inside the vehicle.

Underneath the vehicle, 530: Could be positioned behind a cover 535, such as a plastic cover, underneath the vehicle. This may be a good location if the first sensor assembly also is used for detection of road conditions. It may be necessary to protect the first sensor assembly from mud, snow, etc pulled up by the wheels and the wind flowing under the vehicle.

Inside the vehicle, 540: A protective environment. However, external sounds will be subdued. The sensor may be exposed to crash sounds in various music or other sounds coming from speakers inside the vehicle.

Inside the fin antenna on the roof, 550: This position might be advantageous since it is far away from the engine and the sensor will not be disturbed by sounds from inside the vehicle.

The onboard perception system 105 or the collision avoidance system 100 may be manufactured and sold as a separate unit, but is normally sold and used as a part of a vehicle, such as a car, lorry, truck or bus.

Figure 5:
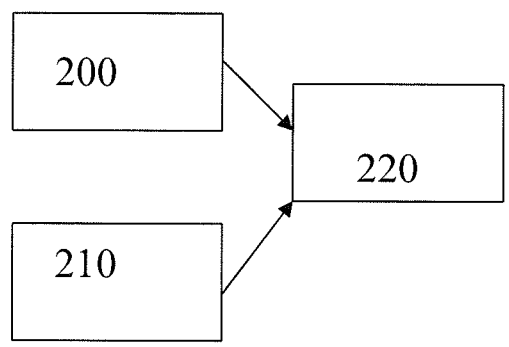
FIG. 5 is a flowchart of a method according to the invention.

A method for evaluating a reason of a change in dynamic state of the first external object 6 may comprise the following steps as illustrated in FIG. 5:

200: assessing the dynamic state of the first external object 6,

210: assessing sound information from a vicinity 12 of the vehicle 4, and

220: analyzing the sound information in order to evaluate the reason of the change of the state of the first external object 6.

Typically, the steps of assessing the state 200 and assessing sound information 210 are carried out continuously or intermittently. They may be carried out in parallel, as illustrated, or consecutively. These two steps 200, 210 are preferably carried out independently of each other. In the next step 220, the sound information is analyzed in order to evaluate the reason of the change in the state of the first external object 6.

In the illustrated embodiment, the distance d may be assessed by actually measuring the distance by a second sensor assembly as explained above.

Purely as an example, the sound information may comprise information that the lead vehicle 6 has been involved in a collision. The system may then draw the conclusion that the unexpected change of the state was due to the collision. The system may therefore rule out that the assessed state, e.g. the distance d, is a false value caused by an erroneous measurement. Since a collision has been detected, the measured value is highly probable.

The sound produced by a collision is loud and has a distinct spectral pattern. Also other causes resulting in unexpected change of the state, such as the lead vehicle 6 running into a deep hole in the road, onto a road sign, a guard rail, a drainage lid or having a fatal breakdown like dropping a wheel, have quite distinct spectral patterns. Due to the high volume of such sounds, it is possible to place a sound sensor either inside or outside the vehicle as explained above. Other sounds from the vehicle, such as people speaking or playing music, have other spectral patterns, and are thus possible to distinguish from the sound of e.g. a collision.

The sound may be analyzed by evaluating its loudness and spectral pattern. One way would be to make a frequency analysis of the sound and to compare the frequency content with a library of stored sounds. The library may in that case comprise collision sounds or other sounds typical of unexpected motion changes of the first external object, such as running into a deep hole in the road, onto a road sign or having a fatal breakdown like dropping a wheel. The library may be stored in a readable storage unit comprised in the onboard perception system 105. If the sound is sufficiently loud and provides suitable matches with a stored collision sound, then the cause of the sound may be classified as a collision.

Alternatively, the sound may be split into a sequence of waveforms. Thereafter each waveform may be matched against a library of stored collision template waveforms or waveforms for other events resulting in an unexpected motion change of the first external object as mentioned above. The library may be stored in a readable storage unit comprised in the onboard perception system. If the sequence of consecutive waveforms are sufficiently loud and provide suitable matches with the stored waveforms, then the cause of the sound may be classified as a collision. The library of stored collision template waveforms may be taken from recorded sounds from actual collision tests.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for evaluating a reason of a detected change in dynamic state of an object located in a vicinity of a vehicle hosting an onboard perception system, said method comprising:
   assessing audible sound information originating from a source other than a collision involving said host vehicle using a sound sensor assembly;
   analyzing said sound information to evaluate the reason of said detected change in dynamic state of the object; and
   controlling an action of the vehicle based on the evaluation of said reason of said detected change in state.

2. The method of claim 1 further comprising controlling the action such that the vehicle is braked in order to avoid a collision with the object.

3. An onboard perception system for a vehicle comprising:
   a sensor assembly assessing a dynamic state of an object in a vicinity of the vehicle;
   a sound sensor assembly receiving and assessing audible sound information originating from a source other than a collision involving the vehicle;
   an evaluation unit detecting a change in the dynamic state of the object and analyzing the sound information in combination with information from the sensor assembly to assess a reason for the change in the dynamic state; and
   wherein an action of the vehicle is controlled based on the assessed reason for the change in the dynamic state of the object.

4. The onboard perception system according to claim 3, wherein the dynamic state of the object is at least one of a position, velocity, acceleration, heading angle, yaw rate, roll angle, roll rate, pitch angle, and pitch rate of the object or combinations thereof.

5. The onboard perception system according to claim 3, wherein said evaluation unit is adapted to detect a collision between the object and a second object, said collision at least contributing to said change in the state of the object.

6. The onboard perception system according to claim 3, wherein said sensor assembly comprises at least one of: a radar sensor, a lidar sensor, a camera, a stereo-camera, an ultra-sonic sensor and an IR sensor.

7. The onboard perception system according to claim 3, wherein said sound sensor assembly comprises a plurality of sensors positioned at separate locations on the vehicle.

8. The onboard perception system according to claim 3, wherein the evaluation unit is further operative to consider a first and a second traffic situation hypothesis for said vicinity of said vehicle, the first hypothesis being a normal traffic situation and the second hypothesis being a collision situation involving the object and a second object, and is further operative to select one of said hypotheses based on said assessed sound information and said assessed dynamic state of the object.

9. The onboard perception system according to claim 3, wherein an output from said onboard perception system comprises a determination that the object was subjected to a safety influencing incident.

10. The onboard perception system of claim 3 wherein the sensor assembly and the evaluation unit are included within a vehicular collision avoidance system.

11. The onboard perception system of claim 3 wherein outputs from the evaluation unit are communicated to an action system operable to execute an action of the vehicle based on the change in the state of the object determined by the evaluation unit.

12. The onboard perception system of claim 11 wherein said action includes braking the vehicle to avoid a collision with the object.

13. A method for operating a safety system of a vehicle comprising:
   operating a sensor assembly to assess a dynamic state of an object in a vicinity of the vehicle;
   detecting a change in the dynamic state of the object;
   operating a sound sensor assembly to receive and assess audible sound information originating from a source other than a collision involving the vehicle;
   analyzing the sound information in combination with information from the sensor assembly to assess a reason for the change in the dynamic state; and
   controlling an action of the vehicle based on the assessed reason for the change in the dynamic state.

14. The method according to claim 13 further comprising:
   considering a first and a second traffic situation hypothesis for said vicinity, the first hypothesis being a normal traffic situation and the second hypothesis being a collision situation involving the object and a second object, and
   selecting one of said hypotheses based on the analysis of the sound information in combination with the assessed state of said object.

15. The method according to claim 14 further comprising controlling an action of said vehicle to avoid a collision with the object, execution of the action being based at least in part on said selected one of said hypotheses.

* * * * *